United States Patent Office 3,301,842
Patented Jan. 31, 1967

3,301,842
PROCESS FOR ISOLATING $\alpha_1$-ANTITRYPSIN FROM HUMAN OR ANIMAL HUMORS
Hermann E. Schultze and Karl Heide, Marbach, near Marburg (Lahn), and Heinz Haupt, Marburg (Lahn), Germany, assignors to Behringwerke Aktiengesellschaft, Marburg (Lahn), Germany, a corporation of Germany
No Drawing. Filed Mar. 1, 1963, Ser. No. 262,228
Claims priority, application Germany, Mar. 3, 1962, B 66,202; Mar. 8, 1962, B 66,260
4 Claims. (Cl. 260—112)

The present invention relates to the isolation of $\alpha_1$-antitrypsin from human or animal humors.

It is known that $\alpha_1$-antitrypsin, also known as $\alpha_1$-3.5-S glycoprotein, can be isolated by fractionation of serum on exchange columns such as DEAE-cellulose columns or Dowex exchange columns. However, these fractionation processes are not satisfactory, because the yield of $\alpha_1$-antitrypsin, which is a very unstable substance, is too small and the fractionation of large amounts is uneconomic.

Now, we have found that $\alpha_1$-antitrypsin can be isolated from human or animal humors by first proceeding under the conditions described in Z. Naturforschung 10b, 463, 1955, for example, by (a) adding a saturated solution of ammonium sulfate adjusted to a pH of about 8.0 to an ascites or serum solution from human or animal humors having a protein content of about 3.8% until said ascites or serum solution is about 45% saturated with ammonium sulfate and a precipitate is obtained, (b) separating said precipitate from the solution, (c) adjusting the remaining solution with acetic acid to a pH of about 5.0, (d) adding to the remaining solution a saturated ammonium sulfate solution having a pH of about 5.0 until said remaining solution is about 62% saturated with ammonium sulfate and a precipitate is obtained, (e) separating said precipitate from this solution, and (f) removing said ammonium sulfate from said solution containing said $\alpha_1$-antitrypsin fraction, and then isolating $\alpha_1$-antitrypsin from said fraction by (A) adding to said fraction a compound selected from the acridine or quinoline series, preferably 2-ethoxy-6,9-diamino-acridine lactate or bis-(2-methyl-4-amino-quinolyl-6)-carbamide hydrochloride, at a pH-value of 5.5 to 6.5, (B) preferably 6.0, in a substantially salt-free medium and at a protein concentration ranging from 1–6%, (C) preferably 2%, the addition being continued until the proteins which accompany $\alpha_1$-antitrypsin precipitates, rejecting the precipitate, precipitating from the liquid portion the $\alpha_1$-antitrypsin by increasing the pH-value to 5.6–7.5, preferably 7.0, and also the concentration of the compound of the acridine or quinoline series previously added, (D) isolating the precipitate obtained, (E) dissolving it in water and (F) precipitating the precipitant at a pH-value of 4.0 to 5.5 by means of mineral salts, preferably sodium chloride or ammonium sulfate, (H) adjusting the pH of the $\alpha_1$-antitrypsin solution obtained to a value in the range of 5.0–6.0, preferably 3.5, (I) precipitating $\alpha_1$-antitrypsin at a temperature in the range from $-1.0°$ to $-5.0°$ C. by adding an organic protein precipitating agent, preferably methanol or ethanol, to a content in the medium of 40–50%, preferably 45%, (J) dissolving the precipitated $\alpha_1$-antitrypsin in water, while removing the organic precipitant in known manner, preferably by dialysis or lyophilization, and (K) concentrating the $\alpha_1$-antitrypsin solution in known manner, for example by ultrafiltration, and/or lyophilizing it.

In the above-cited fractionation with ammonium sulfate, first the gamma globulin, the $\alpha_2$-globulins, and the major part of the albumin are precipitated from the serum. The solution L IV+VI obtained contains $\alpha_1$-antitrypsin, $\beta$-globulins and parts of $\alpha_1$-globulins and albumin. From this starting solution, $\alpha_1$-antitrypsin is isolated by the process of the present invention.

Instead of the $\alpha_1$-antitrypsin-containing fraction obtained by ammonium sulfate precipitation from serum, ascites or other human or animal humors, there may also be used as starting material the $\alpha_1$-antitrypsin-containing fraction obtained by alcohol fractionation of plasma, ascites or other human or animal humors (according to J. Am. Chem. Soc. 68, 459 [1946]) i.e., by adding ethanol to plasma or ascites derived from human or animal humors at a pH of about 7.2 and a temperature of about 0° C. until the ethanol concentration reaches 8% by volume while the temperature is reduced to about $-3°$ C., whereby a precipitate is obtained, separating said precipitate, adjusting the pH of the solution to about 6.9, adding ethanol to the solution at about $-5°$ C. until the ethanol concentration reaches 25% by volume, separating the precipitate formed thereby, adjusting the pH of the solution to about 5.2, diluting the solution with water at about $-5°$ C. until the ethanol concentration of the solution is about 18% by volume, separating the precipitate thus formed, and removing the ethanol from the remaining solution which contains said $\alpha_1$-antitrypsin fraction.

After removal of the main quantity of gamma globulin and fibrinogen from the plasma as indicated in the said literature, the $\alpha$-globulins precipitate at higher alcohol concentration in the form of $\alpha_1$-antitrypsin containing precipitates. These precipitates are designated in the cited literature as fraction IV–1.

When using the afore-mentioned starting material, $\alpha_1$-antitrypsin is suitably isolated by first liberating the $\alpha_1$-antitrypsin-containing fraction obtained by alcohol fractionation from plasma or ascites according to J. Am. Chem. Soc., 68, 459 (1946), from alcohol in known manner, for example by dialysis or lyophilization, (A) adding to said fraction a compound of the acridine or quinoline series, preferably 2-ethoxy-6,9-diamino-acridine lactate or bis-(2-methyl-4-amino-quinolyl-6)-carbamide hydrochloride, at a pH-value of 5.5–6.5, preferably 6.0, in a practically salt-free medium and at a protein concentration ranging from 1 to 6%, preferably 2%, the addition being continued until the proteins which accompany $\alpha_1$-antitrypsin precipitate, (B) rejecting the precipitate, (C) precipitating from the liquid portion the $\alpha_1$-antitrypsin by increasing the pH-value to 6.5–7.5, preferably 7.0, and also the concentration of the compound of the acridine or quinoline series previously added, (D) isolating the precipitate, (E) dissolving it in water and (F) precipitating the precipitant at a pH-value of 4.0–5.5 by means of mineral salts, preferably sodium chloride or ammonium sulfate, (G) separating the precipitant from the solution, (H) adjusting the pH-value of the $\alpha_1$-antitrypsin solution so obtained to a value in the range of 4.5 to 6.0, preferably 5.0, (I) liberating it from other globulins by means of ammonium sulfate up to a saturation of 60%, (J) removing therefrom the ammonium sulfate in known manner, preferably by dialysis, and, (K) concentrating the pure $\alpha_1$-antitrypsin solution obtained in known maner, for example, by ultrafiltration, and/or lyophilizing it.

As compounds of the acridine or quinoline series, there are preferably used 2-ethoxy-6,9-diamino-acridine lactate or bis-(2-methyl-4-aminoquinolyl-6)-carbamide hydrochloride. 3,6-diamino-10-methylacridinium chloride, 5-amino acridine, $\alpha$-, $\gamma$-trimethylene glycol-di-(2-methyl-4-amino)-6-quinolylether diacetate, and di-n-butylmalonic acid - N,N-di-(2-methyl-4-aminoquinolyl-6)-diacetate are also suitable for the process of the present invention.

For removing the precipitating agents of the acridine or quinoline series, there are generally suitable, in addition to sodium chloride and ammonium sulfate, alkali metal halides, for example, sodium bromide, potassium chloride, potassium bromide, and potassium thiocyanate.

A special advantage of the present invention is that the other biologically valuable serum proteins such as gamma globulin, albumin, etc. can be isolated by the process of the present invention without being affected. Furthermore, the present invention permits the processing of larger amounts of starting substance than is possible with known processes for isolating $\alpha_1$-antitrypsin and the recovery of $\alpha_1$-antitrypsin in a yield hitherto unattainable. The process proceeds under very mild conditions, so that the biological activity is fully maintained after isolation.

The $\alpha_1$-antitrypsin obtained by the method of the present invention binds trypsin or chymotrypsin in stoichiometrical ratio and thereby inhibits trypsin and chymotrypsin activity. This property is of therapeutical value in the case of pancreatites and burns, where $\alpha_1$-antitrypsin is able to inhibt the enzymatical trypsin activity.

*Determination of the antitryptic activity*

For determining the antitryptic activity, the conversion of fibrinogen into fibrin is used as indicator. This conversion can be produced by the action of trypsin or thrombin. This system is inhibited by antitrypsin.

For determining the antitryptic activity, 0.1 cc. of an antitrypsin solution of known concentration but unknown activity, and for control 0.1 cc. of serum, are added to 0.2 cc. each of freshly distilled trypsin solutions of decreasing concentration (dilution series in borate buffer having a pH-value of 7.4–7.6).

The mixtures are incubated for 10 minutes at 37° C. Then, 0.5 cc. of bovine fibrinogen (0.2% strength) are dissolved in borate buffer and, after a further 10 minutes, 0.2 cc. of a thrombin solution containing per cc. 20 units of thrombin are added. After having allowed the mixture to stand for 5 minutes at 20° C., readings are taken.

The tube with the antitrypsin solution without clots contains trypsin and antitrypsin in equivalent amounts.

The following examples illustrate the invention but they are not intended to limit it thereto:

EXAMPLE 1 (CF. FLOW SHEET I)

To 1 liter of a solution L IV+VI of 2% strength, obtained by ammonium sulfate fractionation of serum according to the method described by Schultze et al. (Z. Naturforschung 10b, 463, 1955), the pH-value of which had been adjusted while stirring to 6.0 with 2 N-hydrochloric acid, were added 50 cc. of a 2% solution of 2-ethoxy-6,9-diamino-acridine lactate and, after having allowed the mixture to stand for 5 hours, it was centrifuged for 10 minutes at 3000 revolutions per minute.

The pH-value of the liquid portion was adjusted to 7.0 by means of 2 N-sodium hydroxide solution, $\alpha_1$-antitrypsin was precipitated by adding a further 150 cc. of a 2% solution of 2-ethoxy-6,9-diamino-acridine lactate and separated by centrifugation.

The $\alpha_1$-antitrypsin-containing precipitate was taken up in 400 cc. of ice-cold water and dissolved by adjusting the pH-value to 5.0 with 2 N-hydrochloric acid.

The 2-ethoxy-6,9-diamino-acridine compounds used was then removed from the protein solution by adding 12 g. of solid sodium chloride while stirring 10 minutes and by subsequent filtration.

The pH-value of the liquid portion (370 cc.) which contained the $\alpha_1$-antitrypsin, was adjusted to 5.5 by means of 2 N-sodium hydroxide solution, and precipitation was caused, while stirring continuously at a temperature in the range of −1 to −5° C., by adding 462 cc. of methanol of 90% strength (50% methanol in the medium) which contained 10% of a 0.5 molar acetate buffer having a pH-value of 5.5. The precipitate was separated by centrifugation at −5° C. and dissolved in 100 cc. of ice-water. After adjustment of the pH-value to 7.0 with a 10% sodium bicarbonate solution, the product was promptly lyophilized.

The yield of 70% pure $\alpha_1$-antitrypsin was 6.1 g. Its trypsin binding capacity per weight unit was found to be about 30–40 times as strong as that of normal serum.

EXAMPLE 2

The pH-value of the liquid portion (350 cc.) obtained from 1 liter of the fraction L IV+VI according to Example 1 by addition of 2-ethoxy-6,9-diamino-acridine lactate, was adjusted to 5.5 by means of a 2 N-sodium hydroxide solution and, while stirring mechanically and at −1° C. to −5° C., 350 cc. of methanol of 90% strength (45% of methanol in the medium) which contained 10% of a 0.5 molar acetate buffer and had a pH-value of 5.5, were added thereto. The precipitate formed was isolated by centrifugation at −5° C. and dissolved in 100 cc. of ice-water. The pH-value of the solution thus obtained was adjusted to 7.0 by means of a sodium bicarbonate solution of 10% strength and the product was then lyophilized.

The yield of $\alpha_1$-antitrypsin amounted to 3.8 g.; the product was practically 100% pure. It was found to bind, per weight unit, about 50 times more trypsin than normal serum.

EXAMPLE 3

To 1 liter of a solution L IV+VI of 2% strength, prepared from serum according to the method described by Schultze et al. (cf. Example 1) by ammonium sulfate fractionation, the pH-value of which had been adjusted, while stirring, to 6.0 with 2 N-hydrochloric acid, were added, while stirring, 40 cc. of a 1% solution of bis-(2-methyl-4-aminoquinolyl-6)-carbamide hydrochloride and after having allowed the whole to stand for 5 hours, it was centrifuged for 10 minutes at 3000 revolutions per minute.

The pH-value of the liquid portion was adjusted to 7.0 by means of 2 N-NaOH, the $\alpha_1$-antitrypsin was precipitated by adding a further 160 cc. of a 1% solution of bis-(2-methyl-4-aminoquinolyl-6)-carbamide hydrochloride and then separated by centrifugation.

The $\alpha_1$-antitrypsin-containing precipitate was taken up in 400 cc. of ice-cold water and dissolved by adjusting the pH-value to 4.5 by means of 2 N-hydrochloric acid.

The bis-(2-methyl-4-aminoquinolyl-6)-carbamide compound was precipitated from the protein solution by adding 12 g. of solid ammonium sulfate while stirring 10 minutes and then removed by subsequent filtration.

The pH-value of the liquid portion (380 cc.), which contained the $\alpha_1$-antitrypsin, was adjusted to 5.5 with 2 N-sodium hydroxide solution, and precipitation was caused, while continuously stirring, at −1° to −5° C., by the addition of 475 cc. of methanol of 90% strength containing 10% of a 0.5 molar acetate buffer having a pH-value of 5.5. The precipitate formed was separated by centrifugation at −5° C. and dissolved in 100 cc. of ice-water. After adjustment of the pH-value to 7.0 by means of a 10% sodium bicarbonate solution, the whole was immediately lyophilized.

The yield of $\alpha$-antitrypsin was 5.8 g.

EXAMPLE 4

1 liter of a solution L IV+VI of 2% strength prepared from ascites, instead of from serum, by ammonium sulfate fractionation (cf. Example 1), was purified as described in Example 1 by treatment with 2-ethoxy-6,9-diamino-acridine lactate and methanol.

The yield of $\alpha_1$-antitrypsin that had a purity of 70% was 7.3 g.

EXAMPLE 5 (CF. FLOW SHEET II)

20 g. of "Fraction IV–1" having the form of a dry substance obtained from plasma by alcohol fractionation according to J. Am. Chem. Soc. 68, 459 (1946), were dissolved in water, made up to 1 liter and adjusted to a pH-value of 6.0 with 2 N-hydrochloric acid. To this solution were added, while stirring, 50 cc. of a 2% solution

FLOW SHEET I
for fraction L IV + VI
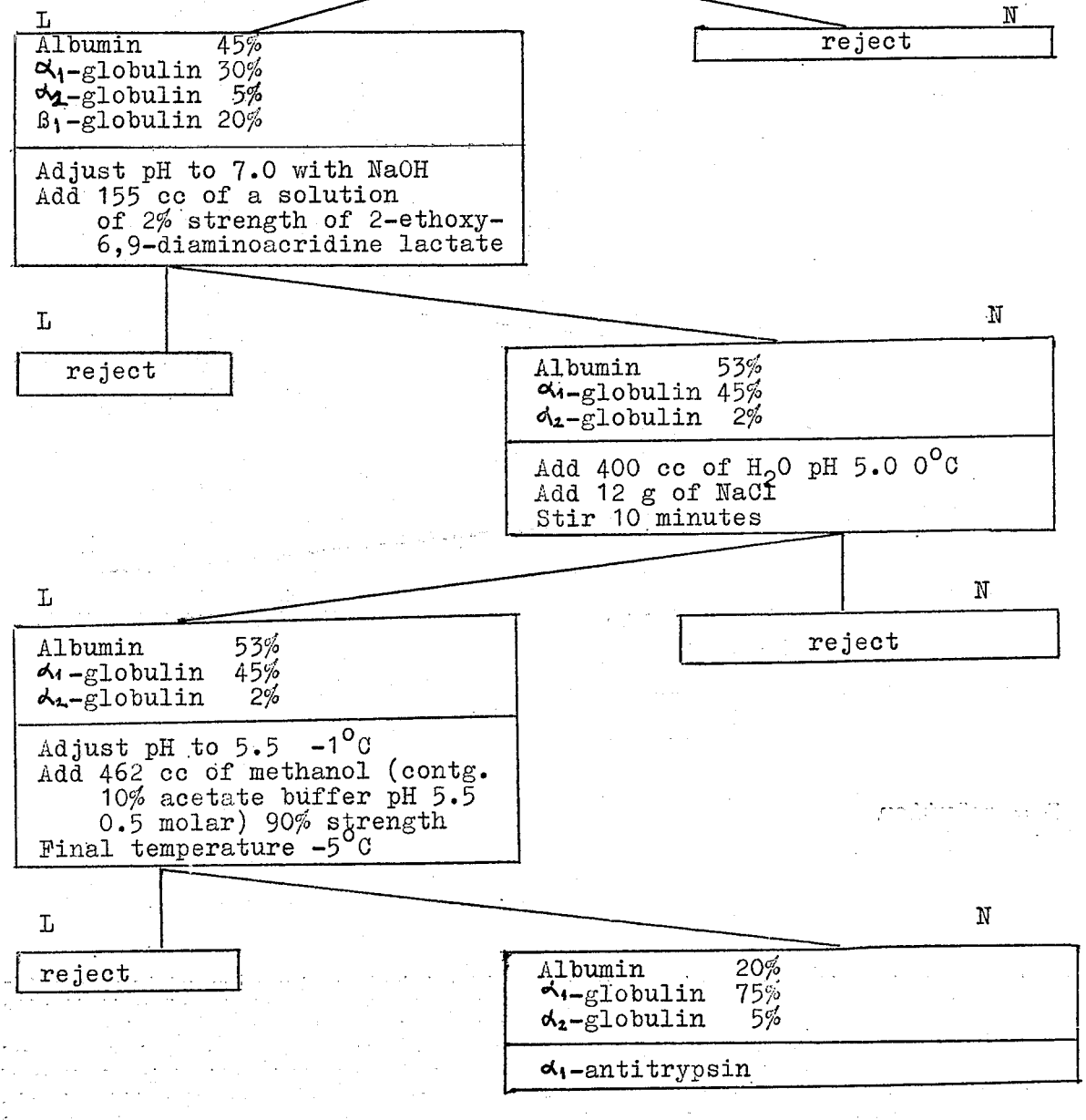
L = solution
N = precipitate

FLOW SHEET II for fraction IV-1

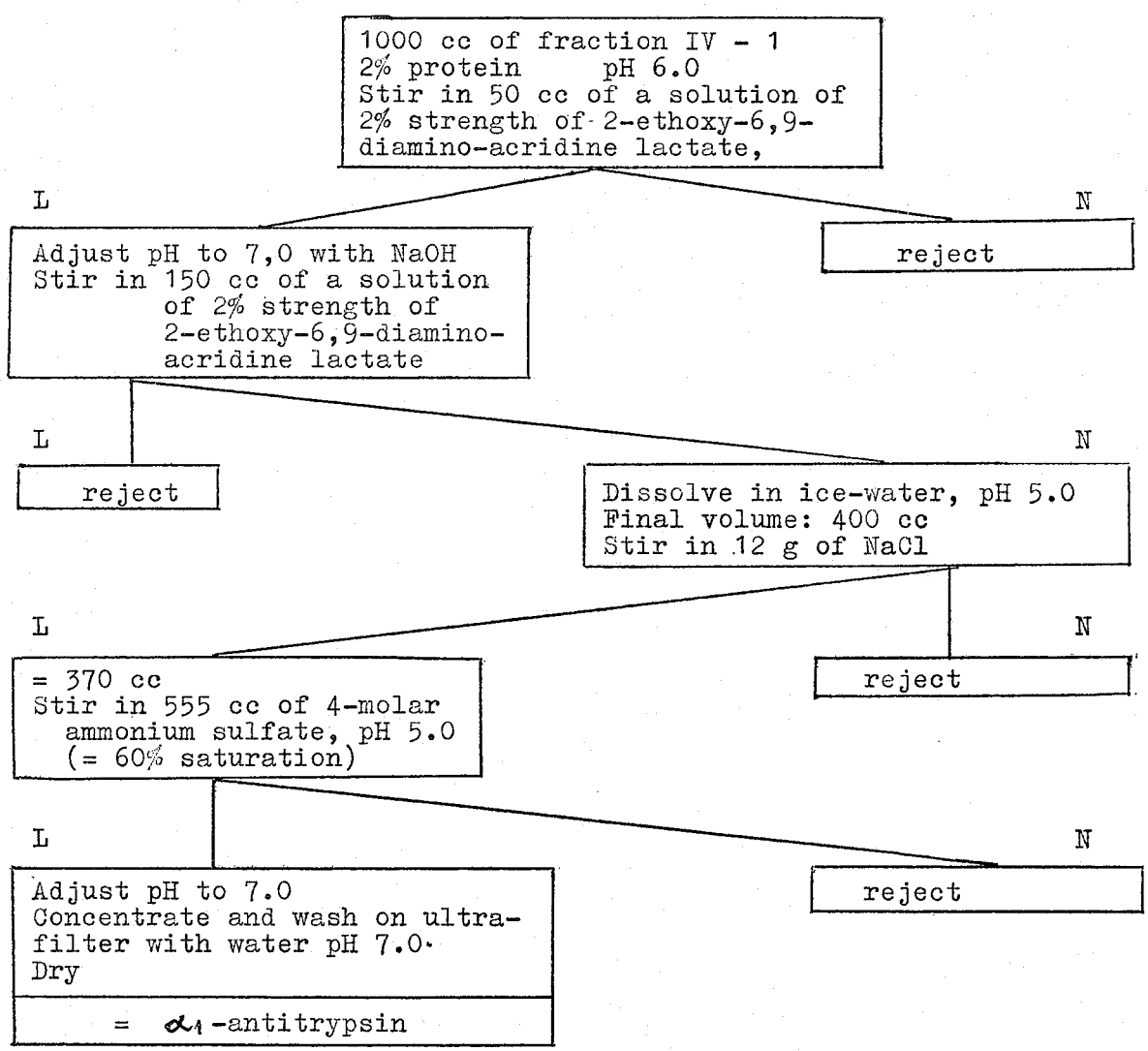

L = solution

N = precipitate of 2-ethoxy-6,9-diamino-acridine lactate, and, after having allowed the mixture to stand for 5 minutes, it was centrifuged for 10 minutes with 3000 revolutions per minute. The pH-value of the liquid portion was adjusted to 7.0 with a 2 N-sodium hydroxide solution, $\alpha_1$-antitrypsin was precipitated by adding a further 150 cc. of a 2% solution of 2-ethoxy-6,9-diamino-acridine lactate and separated by centrifugation.

The $\alpha_1$-antitrypsin-containing precipitate was taken up in 400 cc. of ice-cold water and dissolved by adjusting the pH-value to 5.0 by adding 2 N-hydrochloric acid. The acridine derivative used was removed from the protein precipitate by adding 12 g. of solid sodium chloride while stirring 10 minutes and by subsequent filtration.

The clear liquid portion (370 cc.) obtained was caused to precipitate by the addition with stirring of 555 cc. of a saturated ammonium sulfate solution which had a pH-value of 5.0 (=60% saturation) and centrifuged for 20 minutes with 3000 revolutions per minute. The pH-value of the liquid portion which contained the $\alpha_1$-antitrypsin, was adjusted to 7.0 by means of 2 N-sodium hydroxide solution, the product was concentrated by ultrafiltration and, when the reaction was negative, it was washed with water having a pH-value of 7.0. The product was then lyophilized.

1.6 g. of $\alpha_1$-antitrypsin with a purity of practically 100% were obtained.

We claim:

1. A process for isolating $\alpha_1$-antitrypsin from an $\alpha_1$-antitrypsin-containing fraction obtained by adding a saturated solution of ammonium sulfate adjusted to a pH of about 8.0 to an ascites or serum solution from human or animal humors having a protein content of about 3.8% until said ascites or serum solution is about 45% saturated with ammonium sulfate and a precipitate is obtained, separating said precipitate from the solution, adjusting the remaining solution with acetic acid to a pH of about 5.0, adding to the remaining solution a saturated ammonium sulfate solution having a pH of about 5.0 until said remaining solution is about 62% saturated with ammonium sulfate and a precipitate is obtained, separating said precipitate from this solution, and removing said ammonium sulfate from said solution containing said $\alpha_1$-antitrypsin fraction, said process for isolating $\alpha_1$-antitrypsin from said fraction comprising the steps of (A) adding to said solution containing the $\alpha_1$-antitrypsin fraction a member selected from the group consisting of compounds of the acridine and quinoline series, said solution being maintained at a pH of from about 5.5 to about 6.5 in a substantially salt-free condition at a protein concentration of from about 1% to about 6%, until the proteins accompanying $\alpha_1$-antitrypsin precipitate; (B) separating the precipitate from the $\alpha_1$-antitrypsin-containing solution; (C) adjusting the pH of the solution to from about 6.5 to about 7.5 and further increasing the concentration of said member added in step A until the $\alpha_1$-antitrypsin is precipitated; (D) separating the precipitated $\alpha_1$-antitrypsin-containing material from the solution; (E) dissolving the precipitate in water; (F) adjusting the water solution to a pH of from about 4.0 to about 5.5 and adding an inorganic salt thereto to precipitate said member added in steps A and C; (G) separating the precipitate from the $\alpha_1$-antitrypsin-containing aqueous solution; (H) adjusting the $\alpha_1$-antitrypsin solution to a pH of from about 5.0 to about 6.0; (I) adding from about 40% to 50%, based on the weight of the $\alpha_1$-antitrypsin-containing solution, of an organic protein precipitant to precipitate the $\alpha_1$-antitrypsin therefrom at a temperature in the range from about $-1.0$ to $-5.0°$ C; (J) dissolving the precipitated $\alpha_1$-antitrypsin in water; and (K) lyophilizing the thus purified $\alpha_1$-antitrypsin solution.

2. A process for isolating $\alpha_1$-antitrypsin from an $\alpha_1$-antitrypsin-containing fraction obtained by adding a saturated solution of ammonium sulfate adjusted to a pH of about 8.0 to an ascites or serum solution from human or animal hmors having a protein content of about 3.8% until said ascites or serum solution is about 45% saturated with ammonium sulfate and a precipitate is obtained, separating said precipitate from the solution, adjusting the remaining solution with acetic acid to a pH of about 5.0, adding to the remaining solution a saturated ammonium sulfate solution having a pH of about 5.0 until said remaining solution is about 62% saturated with ammonium sulfate and a precipitate is obtained, separating said precipitate from the solution, and removing said ammonium sulfate from the solution containing said $\alpha_1$-antitrypsin fraction, said process for isolating $\alpha_1$-antitrypsin from said fraction comprising the steps of (A) adding to said solution containing the $\alpha_1$-antitrypsin fraction a member selected from the group consisting of 2-ethoxy-6,9-diamino-acridine lactate, bis-(2-methyl-4-aminoquinolyl-6) - carbamide hydrochloride, 3,6-diamino-10-methyl-acridinium chloride, 5-aminoacridine, $\alpha,\gamma$-trimethylene glycol-di-(2-methyl-4-amino)-6-quinolyl ether diacetate and di-n-butylmalonic acid-N,N-di(2-methyl-4-amino-quinolyl-6)-diacetate, said solution being maintained at a pH of from about 5.5 to about 6.5 in a substantially salt-free condition and at a protein concentration of from about 1% to about 6%, until the proteins accompanying $\alpha_1$-antitrypsin precipitate; (B) separating the protein precipitate from the $\alpha_1$-antitrypsin-containing solution; (C) adjusting the pH thereof to from about 6.5 to about 7.5 and further increasing the concentration of the compound added in step A until said $\alpha_1$-antitrypsin is precipitated; (D) separating the precipitated $\alpha_1$-antitrypsin material from the solution; (E) dissolving the precipitate in water; (F) adjusting the water solution to a pH of from about 4.0 to about 5.5 and adding to the solution an inorganic salt selected from the group consisting of sodium chloride, ammonium sulfate, sodium bromide, potassium chloride, potassium bromide, and potassium thiocyanate to precipitate the compound added in steps A and C; (G) separating the precipitate from the solution; (H) adjusting the $\alpha_1$-antitrypsin-containing solution to a pH of from about 5.0 to about 6.0; (I) adding from about 40% to 50%, based on the weight of the $\alpha_1$-antitrypsin solution, of methanol or ethanol to precipitate the $\alpha_1$-antitrypsin at a temperature of from about $-1.0$ to $-5.0°$ C.; (J) dissolving the precipitated $\alpha_1$-antitrypsin in water; and (K) lyophilizing the thus purified $\alpha_1$-antitrypsin solution.

3. A process for isolating $\alpha_1$-antitrypsin from an $\alpha_1$-antitrypsin-containing fraction obtained by adding ethanol to plasma or ascites derived from human or animal humors at a pH of about 7.2 and a temperature of about $0°$ C. until the ethanol concentration reaches 8% by volume while the temperature is reduced to about $-3°$ C., whereby a precipitate is obtained, separating said precipitate, adjusting the pH of the solution to about 6.9, adding ethanol to the solution at about $-5°$ C. until the ethanol concentration reaches 25% by volume, separating the precipitate formed thereby, adjusting the pH of the solution to about 5.2, diluting the solution with water at about $-5°$ C. until the ethanol concentration of the solution is about 18% by volume, separating the precipitate thus formed, and removing the ethanol from the remaining solution which contains said $\alpha_1$-antitrypsin fraction, said process for isolating $\alpha_1$-antitrypsin from said fraction comprising the steps of: (A) adding to said solution containing the $\alpha_1$-antitrypsin fraction a member selected from the group consisting of compounds of the acridine and quinoline series, said solution being maintained at a pH of from about 5.5 to about 6.5, in a substantially salt-free medium and at a protein concentration of from about 1% to about 6%, until the proteins accompanying $\alpha_1$-antitrypsin precipitate; (B) separating the protein precipitate from the soltuion; (C) increasing the pH of the solution to from about 6.5 to about 7.5 and further increasing the concentration of said member added in step A until the $\alpha_1$-antitrypsin is precipitated; (D) recovering the $\alpha_1$-antitrypsin-containing precipitate; (E) dissolving said $\alpha_1$-antitrypsin precipitate in water; (F) adjusting the pH of the solution to from about 4.0 to about 5.5 and adding an inorganic salt thereto to precipitate said member added in steps A and C from the solution; (G) separating the precipitate from said solution; (H) adjusting the $\alpha_1$-antitrypsin-containing solution to a pH of from about 4.5 to about 6.0; (I) adding ammonium sulfate to said solution up to 60% saturation based on the total solution to precipitate globulins from the $\alpha_1$-antitrypsin-containing solution; (J) removing the ammonium sulfate from the $\alpha_1$-antitrypsin solution; and (K) lyophilizing the $\alpha_1$-antitrypsin solution so obtained to isolate the thus purified $\alpha_1$-antitrypsin.

4. A process for isolating $\alpha_1$-antitrypsin from an $\alpha_1$-antitrypsin-containing fraction obtained by adding ethanol to plasma or ascites derived from human or animal humors at a pH of about 7.2 and a temperature of about 0° C. until the ethanol concentration reaches 8% by volume while the temperature is reduced to about −3° C., whereby a precipitate is obtained, separating said precipitate, adjusting the pH of the solution to about 6.9%, adding ethanol to the solution at about −5° C. until the ethanol concentration reaches 25% by volume, separating the precipitate formed thereby, adjusting the pH of the solution to about 5.2, diluting the solution with water at about −5° C. until the ethanol concentration of the solution is about 18% by volume, separating the precipitate thus formed, and removing the ethanol from the remaining solution which contains said $\alpha_1$-antitrypsin fraction, said process for isolating $\alpha_1$-antitrypsin from said fraction comprising the steps of: (A) adding to said solution containing the $\alpha_1$-antitrypsin fraction a member selected from the group consisting of 2-ethoxy-6,9-diamino-acridine lactate, bis-(2-methyl-4-aminoquinolyl-6)-carbamide hydrochloride, 3,6-diamino-10-methyl-acridinium chloride, 5-aminoacridine $\alpha,\gamma$-trimethylene glycol-di-(2-methyl-4-amino)-6-quinolyl ether diacetate and di-n-butyl malonic acid-N,N-di-(2-methyl-4-amino-quinolyl-6)-diacetate, said solution being maintained at a pH of from about 5.5 to about 6.5 in a substantially salt-free medium and at a protein concentration of from about 1% to about 6%, until the proteins accompanying $\alpha_1$-antitrypsin precipitate; (B) separating the protein precipitate from the solution; (C) increasing the pH of the solution to from about 6.5 to about 7.5 and further increasing the concentration of the compound added in step A until the $\alpha_1$-antitrypsin is precipitated; (D) recovering the $\alpha_1$-antitrypsin-containing precipitate; (E) dissolving said $\alpha_1$-antitrypsin precipitate in water; (F) adjusting the solution to a pH of from about 4.0 to about 5.5 and adding to the solution an inorganic salt selected from the group consisting of sodium chloride, ammonium sulfate, sodium bromide, potassium chloride, potassium bromide, and potassium thiocyanate to precipitate the compound added in steps A and C; (G) separating the precipitate from the solution; (H) adjusting the $\alpha_1$-antitrypsin-containing solution to a pH of from about 4.5 to about 6.0; (I) adding ammonium sulfate to said solution up to 60% saturation based on the total solution to precipitate globulins from the $\alpha_1$-antitrypsin-containing solution; (J) removing the ammonium sulfate from the $\alpha_1$-antitrypsin solution; and (K) lyophilizing the $\alpha_1$-antitrypsin thus purified and isolated.

References Cited by the Examiner

Neurath, The Proteins, vol. III, 1964, pp. 199–203.

WILLIAM H. SHORT, *Primary Examiner.*

H. E. SCHAIN, *Assistant Examiner.*